United States Patent [19]

Borchert et al.

[11] Patent Number: 4,916,452
[45] Date of Patent: Apr. 10, 1990

[54] PROCESS FOR RANGE MEASUREMENT WITH A PULSE RADAR OF HIGH PULSE REPETITION FREQUENCY

[75] Inventors: Wolfgang Borchert; Franz Jehle; Hermann Rohling, all of Ulm, Fed. Rep. of Germany

[73] Assignee: AEG, Fed. Rep. of Germany

[21] Appl. No.: 175,232

[22] Filed: Mar. 30, 1988

Related U.S. Application Data

[63] Continuation-in-part of Ser. No. 930,810, Nov. 13, 1986, abandoned.

[30] Foreign Application Priority Data

Nov. 16, 1985 [DE] Fed. Rep. of Germany ....... 3540717

[51] Int. Cl.$^4$ .......................... G01S 13/46; G01S 13/24
[52] U.S. Cl. ..................................... 342/109; 342/131; 342/194; 342/196
[58] Field of Search .................. 364/729.01, 729.06, 364/724.08, 516, 517; 342/109, 111, 115, 116, 131, 135, 137, 196, 104, 99, 101, 162, 163, 195

[56] References Cited

U.S. PATENT DOCUMENTS

| | | | |
|---|---|---|---|
| 4,063,238 | 12/1977 | Conner, Jr. ..................... | 342/195 X |
| 4,106,019 | 8/1978 | Alexander et al. ............. | 342/137 X |
| 4,375,641 | 3/1983 | Josefsson et al. ............... | 342/131 X |
| 4,746,922 | 5/1988 | Prenat ............................. | 342/109 X |

Primary Examiner—Thomas H. Tarcza
Assistant Examiner—Jr. Barrón
Attorney, Agent, or Firm—McGlew & Tuttle

[57] ABSTRACT

With a frequency-agile pulsed doppler radar with high pulse repetition frequency (HPRF) in the unambiguous velocity region, in order to measure the range of a target the complex time signal derived from the echo signals of a coherent processing interval (CPI) is transformed into the frequency domain, the transformed spectrum is multiplied by a bandpass function with a mean frequency coinciding with the doppler frequency of the target, and the product is transformed back into a time signal. The real envelope of this re-transformed time signal displays a definite leading edge and a steady state region, from which the echo travel time can be estimated. Particular advantages may be derived for the pulsed doppler radar set from a plurality of frequency agile transmitter/receivers operated at the same time at different frequencies, and whose frequency switching times are time-staggered.

15 Claims, 8 Drawing Sheets

PROCESS FOR RANGE MEASUREMENT WITH A PULSE RADAR OF HIGH PULSE REPETITION FREQUENCY

This is a continuation-in-part application of Ser. No. 930,810 filed Nov. 13, 1986, abandoned.

FIELD AND BACKGROUND OF THE INVENTION

The present invention relates in general to radar, and in particular to a new and useful process for measuring range with a pulse radar of high pulse repetition frequency.

The distance between a radar set and the various reflecting objects which receive radio waves from the set is measured in the case of a pulse radar by means of time or frequency shifts in the echo signal, depending on the type of signal transmitted. These changes in the echo signal come about through the signal's travel time T.

The radial velocity components of the target are determined from the doppler frequency occurring in the echo signal with the aid of spectrum analysis methods.

Pulse repetition frequency (PRF), an important signal parameter for the design of the transmitted signal, determines the respective unambiguous region on the range and doppler frequency axes. With pulse radar, the target range is generally measured by the time shift in the echo signal, i.e. by the signal's travel time. If c is the speed of light and $t_O$ is the pulse interval, then the maximum range Rmax that can be unambiguously measured with a pulse radar is $$\text{Rmax} = c/2 \cdot t_O = c/2 \cdot 1/\text{PRF} \quad (1)$$

and the unambiguous region Dmax on the doppler frequency axis is a direct function of PRF $$\text{Dmax} = \text{PRF} \quad (2)$$

From the contrary tendencies observable in the two equations with respect to the scope of the unambiguous region which is a function of PRF, one can see that in designing the transmitted signal a compromise must always be made with respect to PRF.

Ground radar systems are generally designed to have a larger unambiguous range region and therefore have pulse repetition frequencies on the order of less than 1 kHz and hence an unambiguous range region of more than 150 km.

Modern aircraft on-board radars, on the other hand, have the greatest probability of acquiring the target in an operating mode characterized by high pulse repetition frequency (HPRF) and coherent signal evaluation. The measurement parameter of doppler frequency is then generally unambiguous because of the high PRF for the target speeds of interest, but the unambiguous range region is correspondingly small. A signal with a PRF of 200 kHz, for example, has an unambiguous range region of 0.75 km. Such a small unambiguous range region has no practical value, so that with such a process only doppler frequency, and no range information, will be obtained.

To measure range with what is referred to as range gating in the HPRF mode a number of range cells are introduced. At a constant PRF, information is coherently integrated in blocks inside the individual range cells. The range information is first measured relatively precisely, but ambiguously. By block switching of the HPRF, on the basis of a minimum of two different ambiguous range measurements a range estimate can be calculated within a large unambiguous region (/1/Hovanessian, S. A.; "Medium PRF Performance Analysis", IEEE-AES-18, No. 3, May 1982, pp. 286–296). With such an HPRF signal, a substantial expansion of the radar bandwidth is accompanied by necessarily shorter transmitted pulses and scanning intervals.

The range information can also be measured from the frequency shift in the echo signal by the use of a linear FM-ICW transmitted signal in the HPRF mode. The range resolution then depends on the height of the frequency modulation. This again entails an increased radar bandwidth and hence a greater sensitivity to unwanted signals.

SUMMARY OF THE INVENTION

An object of the present invention, therefore, is to indicate a process for range measurement with a pulse radar of high pulse repetition frequency that can be realized with little expense and without increasing the sensitivity to unwanted signals.

Accordingly, another object of the present invention is to provide a process for range measurement with a pulsed doppler radar system with high pulse repetition frequency, which is also capable of unambiguous measurements of velocity information on the target on the basis of the target doppler frequency, and wherein a signal block formed of a plurality of sequential echo signals is coherently processed, comprising transforming a received complex time signal which is received back from a target, into a complex spectrum in the frequency domain, multiplying the complex spectrum by a complex bandpass function whose center frequency equals, (i.e. coincides with) the doppler frequency of the target, retransforming the product back into a time signal, forming the real envelope (magnitude, absolute value) of the time signal, estimating target range based on the leading edge of this envelope by an edge detection technique.

A further object of the present invention is to provide an apparatus for practicing the process.

In comparison with a pulse radar in the HPRF mode without range measurement capability, the process pursuant to the invention requires only steps involving the interpretation of the signal that can be realized with programmable radar signal processors without great expense and without making demands on the transmitted signal pattern or receiver bandwidth that would reduce resistance to clutter.

Without measuring the echo travel time directly, the process pursuant to the invention indirectly evaluates the time delay, equal to the echo travel time, between the first transmitted pulse and the reception of the first echo signal, within a coherently processed block.

The invention therefore offers particular advantages for aircraft on-board radars that are frequency-agile in order to evade enemy jamming and stay on one transmitting frequency only a very short time. The frequent and rapid changes in frequency, which might seem at first thought to interfere with signal or spectrum analysis, offer the advantages in the process pursuant to the invention that after each change of frequency the signal travel time can be measured in the new channel and a great deal of information becomes available for range determination.

A particularly advantageous further development on the invention provides in a radar system simultaneously at different frequencies with frequency-agility in such a way that the frequency switching times for the various devices are time-staggered. All channels used can altogether cover a broad frequency band, so that a high degree of jamming resistance is achieved.

A still further object of the present invention, is to provide an apparatus for the range and velocity measurement for a target, which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWINGS

The invention is explained in greater detail below with reference to the drawings; wherein.

DESCRIPTION OF THE PREFERRED EMBODIMENT

Figure 1:
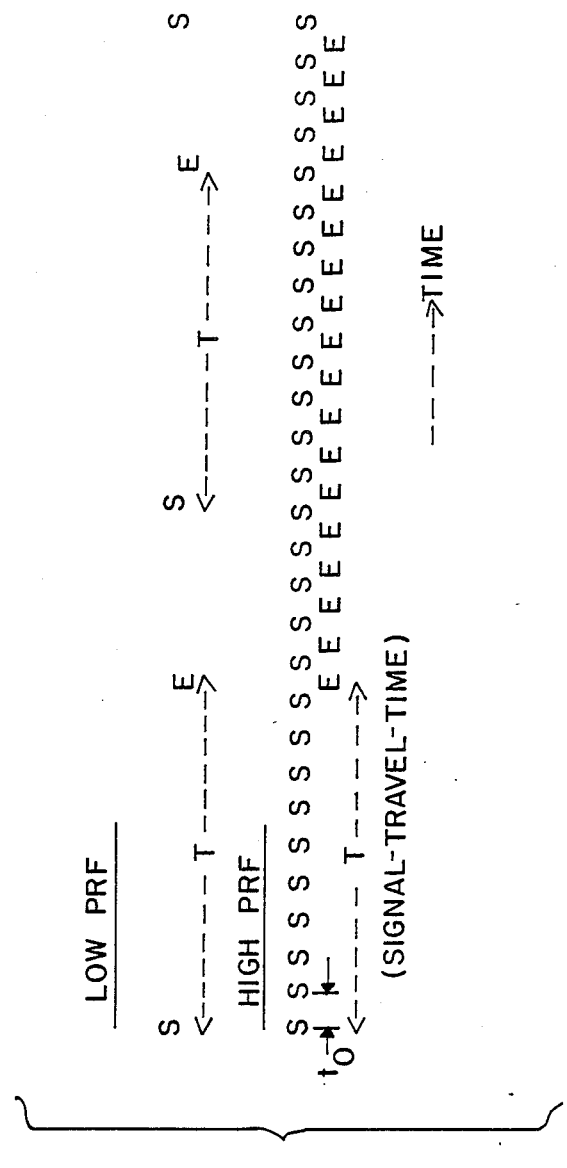
FIG. 1 is a graphic comparison of transmitting-/receiving pulse repetition in LPRF mode and PHRF mode.

Referring to the drawings in particular, the invention embodied therein comprises a process and apparatus for the range measurement of a target using pulsed doppler radar.

With a ground radar with low PRF and high pulse power (FIG. 1, top), there is an unambiguous coordination between the transmitted pulse 5 and the echo pulse E delayed by signal travel time T. The echo signal detected can be allocated directly to one or more range cells.

When a pulse radar with high PRF is switched to a new frequency, quite a number of transmitted pulses S may have been sent out before the first echo pulse E comes back. Given a target range of 150 km, the signal travel time T is approximately 1 ms, so that with a PRF of 200 kHz the first echo is not received until after the two-hundredth pulse has been transmitted (FIG. 1, Bottom).

With a HPRF radar, however, the signal travel time T cannot be directly measured because the S/N (signal to noise) or S/C (signal to clutter) ratio is usually very small. The invention therefore utilizes the amplitude modulation that occurs due to the time delay of the echo (signal travel time T) in the respective receiving channel and derives therefrom in the manner to be described below, an estimated value for the range of the target.

For the sake of simplicity, in the following discussion, only coherent processing of one block with uniform transmission frequency and PRF as a segment bracketed out of frequency-agile operation with a plurality of parallel transmitting/receiving devices is described in detail. Given a pulse repetition frequency of 200 kHz, for example, and a block length of 1024 coherent integrated values (one received value between every two transmitted pulses), we obtain a dwell-time B in one frequency channel of approximately 5 ms.

The wanted signal s(t) within a single one of such channels is described on the one hand as an amplitude-modulated and on the other hand as a doppler-frequency-modulated complex oscillation in the observation interval (O,B):

$$s(t) = \begin{cases} 0 & \text{where } 0 < t < T \\ e^{i \cdot 2\pi \cdot f_D \cdot t} & \text{where } T < t < B \end{cases}$$

The echo signal e(t) results from the overlay of the wanted signal s(t) with a clutter signal c(t).

$$e(t) = s(t) + c(t).$$

After sampling of the receiver's output signal the complex signal e(t) is present in an I- and a Q-channel in the form of 1024 complex values. This complex signal e(t) is transformed, by means of FFT, for example, from the time domain into a complex spectrum E(f) in the frequency domain and stored. To improve target detection in the spectrum E(f), low spectral sidelobes are advantageous. It is known in the art to reduce sidelobe levels by weighting the time signal e(t) with a so-called time window, a Hamming or Blackman window, for instance. The corresponding basis for such a "weighting"are known to the art and are described for example, in /2/ Nuttall, A. H., "Some Windows with very good Sidelobe Behavior", IEEE-ASSP-29, No. 1, February 1981, ppp. 84–91, or /3/ Rohling, H., Schürmann, J., "Discrete Time Window Functions with Arbitrarily low Sidelobe Level", Signal Processing 5 (1983), pp. 127–138.

As is also known in the art (see/2/), the effects of temporal weighting are easily included by means of convolution in the discrete frequency domain with a short sequence of coefficients. Therefore advantageously reduction of sidelobe levels is achieved by transforming the time signal e(t) into a complex spectrum E(f) in the frequency domain by means of a Fourier transform (FFT) and convolving this complex spectrum with a sequence of coefficients as known in the art.

Figure 2A:
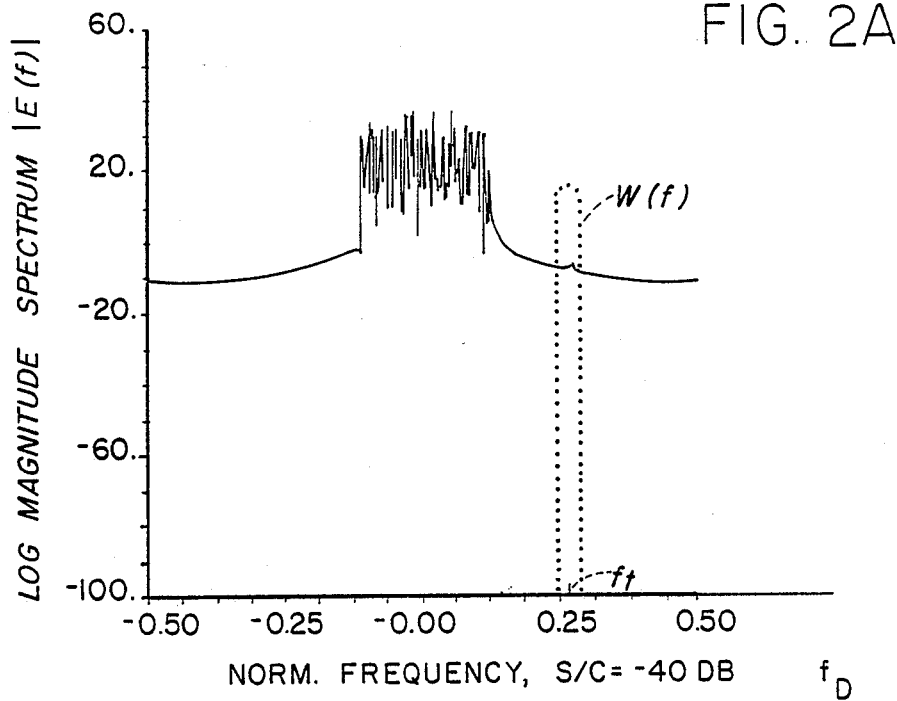
FIGS. 2A and 2B are magnitude spectra of a signal superimposed with clutter and transformed into the frequency domain vie FFT, with FIG. 2A being without additional weighting (rectangular time window) and FIG. 2B being with additional weighting (Blackman time window)
Figure 2B:
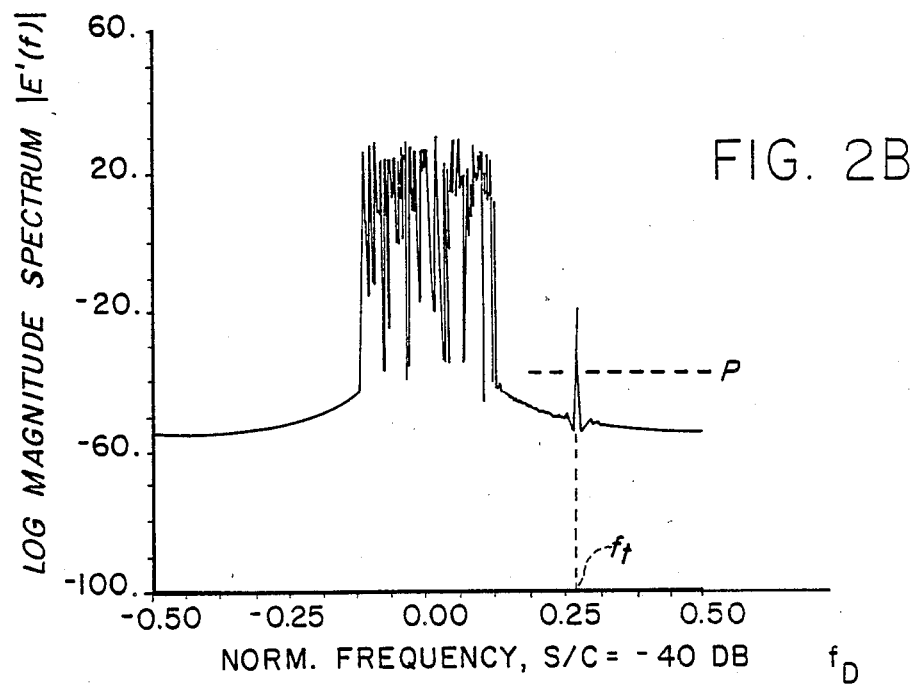

FIGS. 2A and 2B show the real envelope (magnitude) of the complex spectrum of an echo signal in which a wanted signal with an S/C ratio of −40 dB and a standardized doppler frequency of $F_D=0.27$ is contained, without convolution of the spectrum (FIG. 2A) and after convolution of the complex spectrum with the coefficients 0.04, −0.25, 0.42, −0.25, 0.04, which is identical to the use of the Blackman window in the time domain (FIG. 2B).

Figure 5:
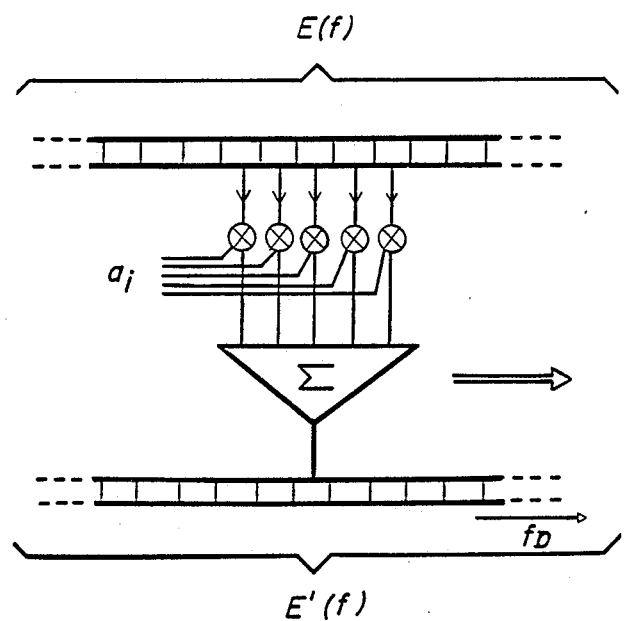
FIG. 5 is a principal arrangement showing the convolution of a spectrum E(f) with a set of coefficients $a_i$ to form a spectrum E'(f) with reduced spectral sidelobes.

Convolution is carried out as usual in that for a set of $2N+1$ coefficients $a_i (i=-N \ldots +N)$ $2N+1$ values of the spectrum $E(f)$ adjacent in frequency are weighted (multiplied) with the $2N+1$ coefficients and the weighted values are summed to form one value of the spectrum $E'(f)$ as schematically shown in FIG. 5. By shifting the arrangement of multipliers and adder one frequency step along the row of stored values of $E(f)$ (as indicated by an arrow in FIG. 5) the next value of $E_i(f)$ is formed and stored In this manner the complete spectrum $E'(f)$ is derived from the spectrum $E(f)$.

The magnitude of the spectrum diagrammed in FIGS. 2A and 2B, preferably 2B, is used for target acquisition in that the target spectrum channel is determined in a usual manner by floating CFAR processing, for example. The port of the spectrum around $f_D=0$ is not evaluated further, because in this spectral region of heavy clutter no targets can be detected. In the portion of the spectrum outside the heavy clutter region a CFAR processing may be applied to derive a threshold P (dashed line in FIG. 2B). A threshold exceeding in the spectrum $E'(f)$ is regarded as originating from a target. The doppler frequency $f(t)$ associated with the target channel is stored for use in completing target acquisition. It is easy to see that in this manner even multiple target situations are resolvable.

In the next processing step, the amplitude modulation of the wanted signal is detected, preparing the way for determination of the signal travel time T or target range R sought. In addition, the stored complex spectrum $E(f)$ and the doppler information on the target are available.

Figure 6:
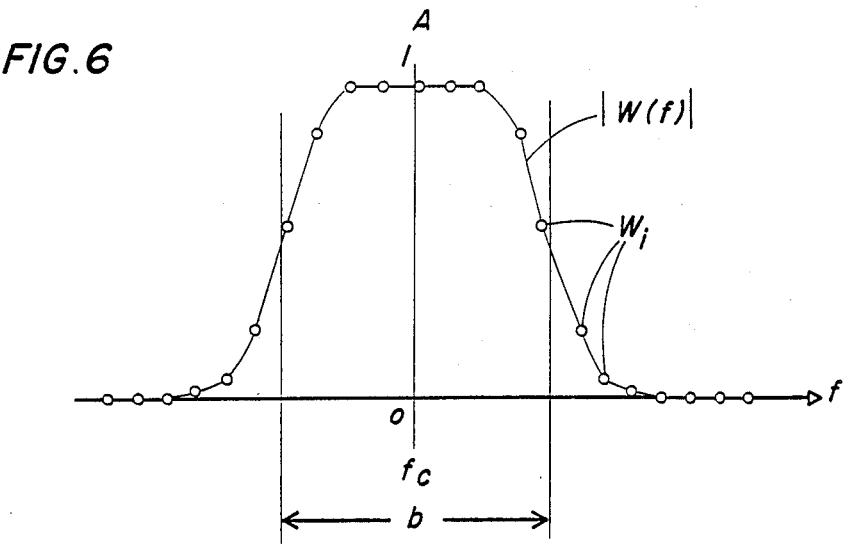
FIG. 6 is the magnitude of a bandpass transfer function and its representation at a row of filter coefficients.
Figure 6:
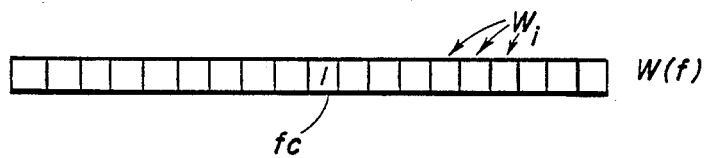

For this purpose, the complex spectrum $E(f)$ is then filtered by a bandpass function $W(f)$ with a center frequency at the previously determined and stored doppler frequency $f_t$ of the target. The magnitude of the bandpass function $W(f)$ for the respective doppler frequencies of the target can either be recalculated each time according to the target doppler frequency (see /4/ Oppenheim, A. V., Schafer, R. W., Digital Signal Processing, Prentice-Hall, 1975), for example, or may already be available stored in a memory. Preferably the filter function is stored as a function with a fixed shape and a variable center frequency $f_c$ and is centered at the determined and stored doppler frequency $f_t$ of the target. The magnitude of the bandpass function $W(f)$ may, for example, have a shape as shown in FIG. 6 with a center frequency fc and a bandwidth b. For filtering a detected target signal in the spectrum $E(f)$, the filter function is centered at the doppler frequency $f_t$ (as shown in FIG. 2A by a dotted line) of a detected target. In the frequency domain bandpass filtering is especially simple since the spectrum of the signal is already present. Filtering is accomplished by multiplying the spectrum $E(f)$ with the filter coefficients representing the shape of the filter function as shown in FIG. 6 and centered at the determined and stored doppler frequency of the target. The stored coefficients of the bandpass filter function may be regarded as the amplitude of the filter function as shown in FIG. 6 by circles on the curve equidistant in frequency. The frequency steps are of the same magnitude as in the spectrum $E(f)$. For a total doppler frequency range of 200 kHz divided into 1024 discrete frequency channels the filter function within a bandwidth of 3 kHz would correspond to about 15 steps respectively, 15 coefficients, for example, with some more coefficients outside the bandwidth b in the region of the filter edges.

Figure 7:
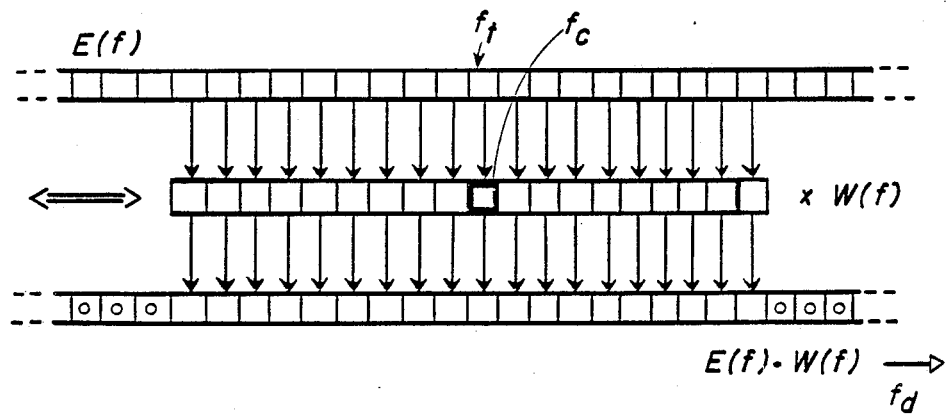
FIG. 7 is schematic arrangement for weighting (multiplying) a spectrum E(f) by a bandpass function W(f)

After determination of a target doppler frequency $f_t$ the filter function $W(f)$ represented by a set of filter coefficients as explained and shown in FIG. 6 is shifted with respect to the spectrum $E(f)$ such that the center frequency $f_c$ of the filter function will coincide with the determined target doppler frequency $f_t$ in the spectrum $E(f)$ (see FIG. 7). Filtering is then carried out by weighting (multiplying) the discrete values of the spectrum $E(f)$ with the corresponding filter coefficients to form the filter output signal $E(f).W(f)$. The spectrum values of the filter output outside the frequency range covered by the filter coefficients are set zero. Although the spectrum $E(f)$ and the filter function $W(f)$ are shown as their real envelopes for reason of explanation, $E(f)$ and $W(f)$ in general are present in complex form and filtering is carried out as complex multiplications.

Figure 3:
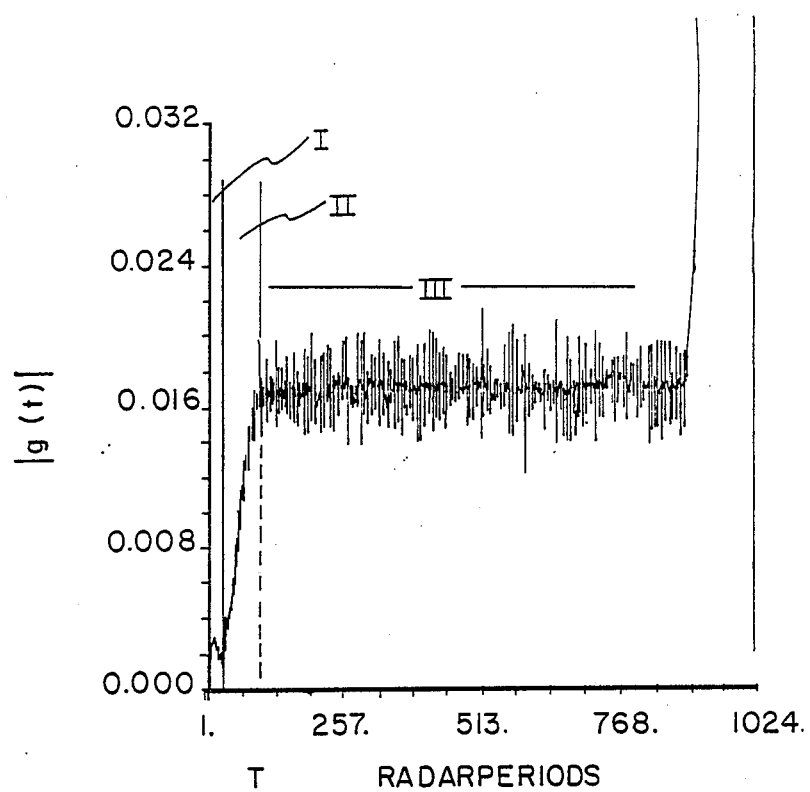
FIG. 3 is the real envelope (magnitude) of signal retransformed back into the time domain.

FIG. 3 shows the real envelope of the time-dependent signal $g(t)$ derived by multiplication of the complex spectrum $E(f)$ from FIG. 2A by a bandpass function $W(f)$, corresponding to a filter with ca. 3 kHz bandwidth and sidelobes of −60 dB, and subsequent Fourier transform into the time domain. As the time scale, the number of radar periods of the coherently processed block is used.

The signal $g(t)$ displays three regions important for purposes of evaluation.

I. At the beginning, intensity is low, corresponding to the absence of the wanted signal components.

II. There follows an essentially linear rise, which can be interpreted as a transient phenomenon during the shifting of the bandpass into the wanted signal area.

III. Once the bandpass is in steady state the intensity remains essentially the same apart from statistical variations.

The sharp rise at the end of the time signal contains no information from the received signal, but is merely a result of filtering the signal superimposed with clutter and is thus irrelevant for purposes of signal analysis.

According to the invention, the signal travel time T sought is estimated from the commencement of the steady state region III of the time signal $g(t)$ by an edge detection technique. Several edge detection techniques are known in the art and, for example, described in "A Survey of Edge Detection Techniques", Computer Graphics and Image Processing (1975) 4, pp. 248–270 by L. S. Davis or "M.I.T. Technical Report, 720 (1983), Finding Edges and Lines in Images" by J. F. Canny and References given therein. A preferred embodiment of an edge detection technique used with the invention is described below in greater detail with reference to FIG. 8.

Figure 8:
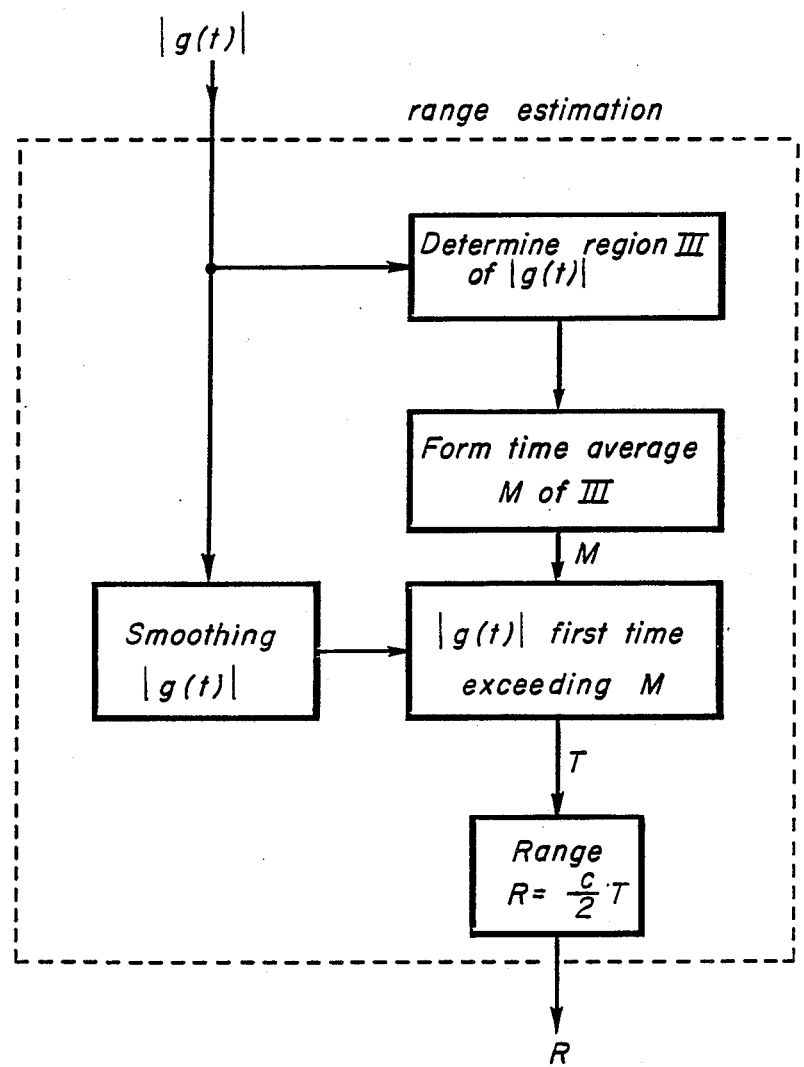
FIG. 8 is a block diagram showing the steps of estimating target range from the time signal $|g(t)|$.

Referring to FIG. 8 on the basis of the real envelope (magnitude, absolute value) $|g(t)|$ of the time signal, which is shown in FIG. 3 in detail, the region III corresponding to the steady state of the filter output is determined and the time average value M of $|g(t)|$ within this region III is formed. This time average value M is taken as a threshold. The time signal $|g(t)|$ or at least its leading edge portion is then smoothed and the smoothed time signal is compared with the threshold. The time of the first exceeding of the threshold is considered as an estimate of the signal travel time T and the target range R sought is derived therefrom as R=C/2.T (c=velocity of light). Referring to FIG. 3 it is obvious, that in spite of the poor S/C ratio of −40 dB assumed in this example, the commencement of the steady state region is clearly detectable in the time signal $|g(t)|$.

The signal processing expense above and beyond mere target acquisition is not high. The additional processing steps for range measurement are performed only when a target is detected.

Figure 4:
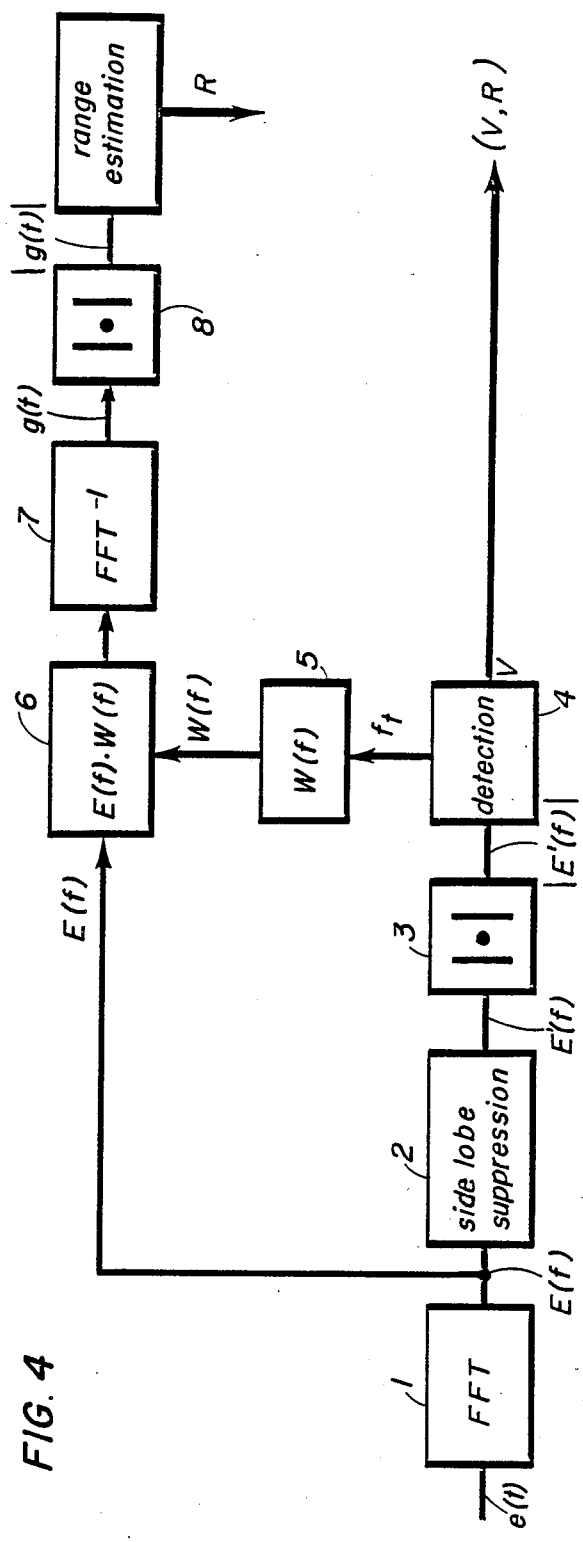
FIG. 4 is block diagram showing the time sequence of the various steps in the process and hardware that can be used to practice the process.

FIG. 4 illustrates the sequence of the individual process steps in the form of a block diagram. The complex time signal e(t) that is available exiting from the receiver after a coherent processing interval is transformed by means of an FFT procedure using Fourier transform means (1) into a complex spectrum E(f) in the frequency domain. For reduction of spectral sidelobes a convolution of this complex spectrum with a few real coefficients corresponding to a temporal weighting of the time signal e(t) is performed leading to the complex spectrum E'(f). This is preferably done in a signal processor.

In the next step, the magnitude $|E'(f)|$ is formed from the complex spectrum E'(f) which magnitude spectrum forms the basis for the subsequent target acquisition (detection). When the target is detected by a detector 4, besides the presence of a target, its target doppler frequency $f_t$ or velocity v is also determined and indicated. So far the process corresponds to signal processing procedures for HPRF radars without range measurement and thus entails no additional expense.

Only when the target is detected during the process step of target acquisition (detection) is the process for determining the target range carried further. For this purpose, according to the scale of the determined doppler frequency $f_t$ of the target, a complex filter transfer function W(f) is calculated or selected from stored filter functions using bandpass filter means 5 as described above. The bandpass filter transfer function may advantageously be chosen as the Fourier transform of a (e.g. Blackman) windowed rectangle in the time domain with a time extent corresponding to about the expected maximum signal travel time $T_m$ax and shifted as described to the determined target doppler frequency.

The complex spectrum E(f) already derived for purposes of target acquisition by transformation of the time signal e(t) and stored in the meantime, is multiplied at complex multiplier means 6 by the filter function W(f), and the product is re-transformed by means of another Fourier transformation (FFT$^{-1}$) by retransform means 7 from the frequency domain into a complex time signal g(t) in the time domain. Forming the real envelope of the complex signal g(t) a signal of the type shown in the diagram in FIG. 3 is derived, from the leading edge of which the echo travel time T and hence the target range R can be estimated at detector 9 in the manner described above (range), so that the amounts that were sought for target range and target speed are now available.

The block diagram in FIG. 4 also clearly shows that the process steps for range measurement that go beyond target acquisition can largely hark back to the procedures required in any case for target acquisition, and the corresponding equipment, e.g. processors, for multiplication, Fourier transformation and forming signal magnitudes can also be used in the time multiplex system on the one hand for target acquisition, on the other hand for determining the range.

A particularly advantageous improvement on the invention provides for transmitting and receiving within one radar system simultaneously on different frequency channels from a large number of channels within a frequency domain by means of a plurality of transmitting-receiving devices operable at the same time at different frequencies with frequency-agility, and in the process of the various devices. Proceeding in this way results both in higher resistance to clutter and better target acquisition probability, since one can assume that not all the channels can be cluttered at the same time and there will always be at least one channel available with a sufficient signal to clutter ratio for target acquisition and range measurement. If the target is detected in several channels, the channel with the best signal/noise ratio can be chosen for further processing. The processing speeds of available processors are so great that all receiving channels can be processed with the same equipment in time multiplex and for double use of some processing steps (FFT, mult., magnit.) for target acquisition and range estimation, a time window can also be kept free in one channel for range estimation.

Figure 9:
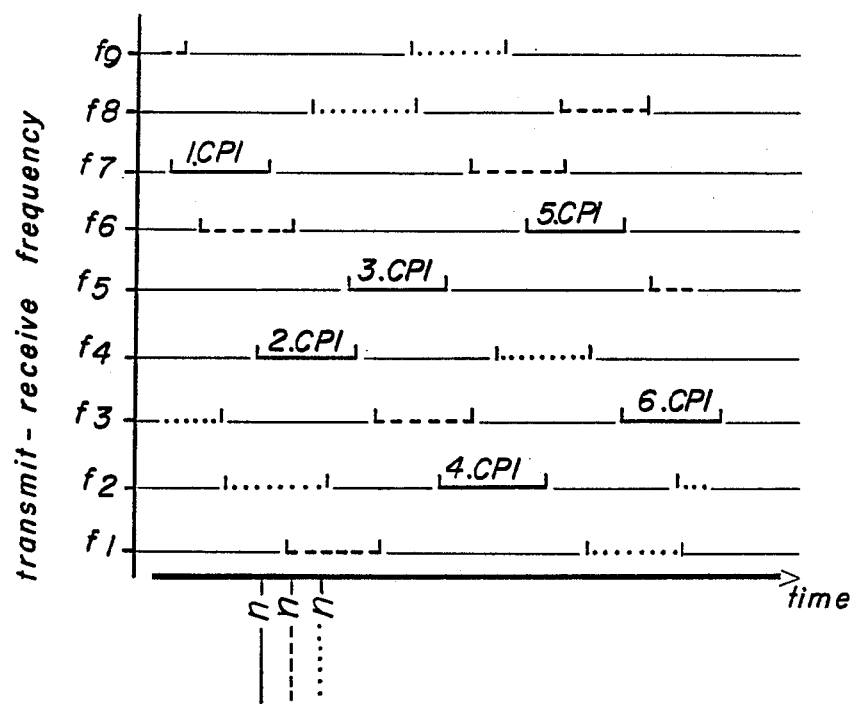
FIG. 9 is a diagram showing the time sequence of switched transmit-receive-frequencies in sequential CPIs for three transmit-receive devices.

FIG. 9 shows a graph indicating the switching of frequencies between nine different transmitting-receiving frequencies f1 through f9. In this graph, the ordinates or the wire axis shows the various nine transmit-receive frequencies while time is plotted on the abscissa or x axis. FIG. 9 shows the switching of frequencies using three transmitter-receiver devices. Each device works in intervals of the same time length or period. In each of the intervals, the receiving signals are coherently integrated (coherent processing interval CPI). The adjustment or switching or switching of the frequencies of each of the different devices is distinguished in FIG. 9 by a continuous line representing a first device a dashed line representing a second device and a dotted line representing a third device . In this way. FIG. 9 shows the individual coherent processing intervals. For the transmitter-receiver device shown with a continuous line, the CPI's are numbered (CPI 1 through 6). After each CPI, the transmitter-receiver frequency is switched. Within each CPI a value is determined for the distance of the target, as discussed above. By switching the frequency, the later arriving echo signals can no longer influence the new determination of the distance using the newly set frequency. The length of a CPI may be, for example, five milliseconds (ms). The switching moments or periods U of the three devices are staggered by the same time interval, so that the evaluation of the echo signals may be carried out advantageously in the time multiplex with the same evaluation device include FFT, side lobe, suppression, detection, filtering, retransformation and range estimation.

While a specific embodiment of the invention has been shown and described in detail to illustrate the application of the principles of the invention, it will be understood that the invention may be embodied otherwise without departing from such principles.

What is claimed is:

1. A process for obtaining range and velocity information for a target using pulsed doppler radar for sending sequential pulsed signals to the target and for receiving signal blocks from the target which are each formed of a plurality of sequential signals, each signal block having a complex time signal, the target having a doppler frequency comprising:

transforming the complex signal (e(t)) of a block into a complex spectrum (E(f)) which is in the frequency domain;

multiplying the complex spectrum by a complex bandpass function whose mean frequency coincides with the doppler frequency of the target, to form a product;

re-transforming the product into a further time signal (g(t));

taking the real signal envelope of the further time signal (g(t)) and analyzing the leading edge of the real signal envelope of the further time signal by an edge detection technique to obtain an estimated value for the range of the target.

2. A process according to claim 1, wherein said analyzing step comprises: creating a time average value (M) from a region of the further time signal which follows the leading edge thereof; using the time average value (M) as a threshold value for the leading edge of the further time signal (|g(t)|), and taking the first instance when the threshold value is exceeded as an estimated value for an echo travel time (T) to and from the target.

3. A process according to claim 2, including smoothing the leading edge of the further time signal before determining if the threshold value has been exceeded.

4. A process according to claim 1, including forming the magnitude spectrum (|E(f)|) of the complex spectrum E(f)), and utilizing the magnitude spectrum (|E(f)|) for target detection.

5. A process according to claim 4, including, prior to target acquisition, convolving the complex spectrum (E(f)), with a set of coefficients corresponding to a weighting in the time domain, to produce a side lobe reduction in the complex spectrum.

6. A process according to claim 1, including operating the pulsed doppler radar at a first frequency for transmitting pulses to form a first block at a uniform pulse repetition pulse repetition rate, and thereafter switching to a second different frequency for a subsequent block, thereby operating the pulse doppler radar in a frequency agile manner.

7. A process according to claim 6, including using a plurality of frequency-agile transmitting-receiving devices to transmit and receive plural radar signals to form plural blocks, and switching to different frequencies between the different devices in a time-staggered manner.

8. A process according to claim 7, including using a common evaluation device for evaluating received signals from all devices by time multiplexing the complex received time signals.

9. A process according to claim 8, including evaluating the signals of each block for their signal-to-noise ratio and selecting the signal with the best signal-to-noise ratio to give the measurement of the range.

10. A device for obtaining range and velocity information for a target which has received pulsed doppler radar signals and has reflected signal blocks each having a plurality of sequential echo signals, each block having a complex time signal, comprising:

Fourier transform means for receiving each complex time signal and for converting each complex time signal from the time domain into a complex spectrum in the frequency domain;

multiplier means connected to said Fourier transform means for receiving the complex spectrum and multiplying the complex spectrum by a complex bandpass function whose center frequency coincides with a doppler frequency of the target, said multiplier means forming a product;

Fourier re-transform means connected to said multiplier means for transforming the product into a further time signal;

magnitude forming means connected to said Fourier retransform means for forming the magnitude of the further time signal, the magnitude of the further time signal having a leading edge; and detector means connected to said magnitude forming means for analyzing the leading edge of the magnitude of the further time signal which contains information for a measurement of range to the target.

11. A device according to claim 10 including convolution means connected to said Fourier transform means for convolving the complex spectrum with a set of coefficients corresponding to a weighting of the complex signal in the time domain to form a sidelobe reduced complex spectrum, second magnitude forming means connected to said convolution means for converting the weighted complex spectrum (E'(f)) into a magnitude (|E'(f)|, a detector, connected to said second magnitude forming means for forming a velocity signal from the magnitude spectrum which corresponds to a velocity of the target, said detector determining the doppler frequency of the target, and bandpass function means connected between said detector and said multiplier means for producing a complex bandpass function from the doppler frequency and applying the bandpass function to the multiplying means to multiply the complex spectrum by the bandpass function.

12. A device according to claim 10 wherein: said detector means includes means to create a time average value M from a region of the further time signal which follows the leading edge of the further time signal; means for using the time average value M as a threshold value for the leading edge of the further time signal and selecting the first instance when the threshold value is exceed as an estimated value for an echo travel time (T) to and from the target.

13. A device according to claim 12, wherein: said detector means includes means for smoothing the leading edge of the further time signal before determining if the threshold value has been exceeded.

14. A process for obtaining range and velocity information for a target using pulsed doppler radar for sending sequential pulsed signals to the target and for receiving signal blocks from the target which are each formed of a plurality of sequential signals, each signal block having a complex time signal, the target having a doppler frequency comprising:

transforming the complex signal (e(t)) of a block into a complex spectrum (E(f)) which is in the frequency domain;

determining the doppler frequency of the target;

multiplying the complex spectrum by a complex bandpass function whose mean frequency coincides with the doppler frequency of the target, to form a product;

re-transforming the product into a further complex time signal (g(t));

forming the absolute value of the further complex time signal; and, analyzing the leading edge of the absolute value of the further complex time signal by an edge detection technique to get an estimate value for the range of the target.

15. A process according to claim 14, wherein: said step of analyzing leading edge includes creating a time average value (M) from a region of the absolute value of the further time signal which follows the leading edge of the absolute value of the further time signal; using the time average value (M) as a threshold value for the leading edge of the absolute value of the further time signal ($|g(t)|$), and taking the first instance when the threshold value is exceeded by the absolute value of the further time signal ($|g(t)|$) as an estimated value for an echo travel time (T) to and from the target.

* * * * *